Jan. 17, 1950  E. BUGATTI  2,494,797
LATHE

Filed Dec. 27, 1945  5 Sheets-Sheet 1

Jan. 17, 1950 E. BUGATTI 2,494,797
LATHE
Filed Dec. 27, 1945 5 Sheets-Sheet 2

Ettore Bugatti
By Mauro & Lewis
Attorneys

Jan. 17, 1950

E. BUGATTI 2,494,797

LATHE

Filed Dec. 27, 1945

Ettore Bugatti
By Mann & Lewis
Attorneys

Jan. 17, 1950　　　　　　　　E. BUGATTI　　　　　　　　2,494,797
　　　　　　　　　　　　　　　　LATHE
Filed Dec. 27, 1945　　　　　　　　　　　　　　　5 Sheets-Sheet 4
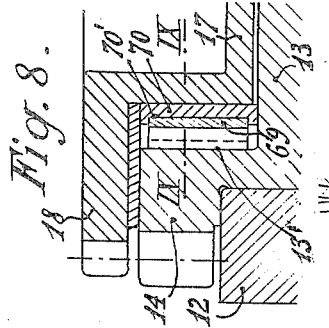
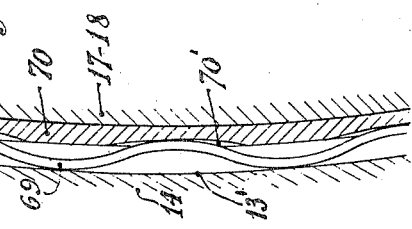
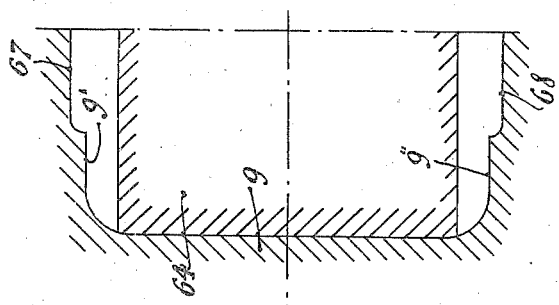
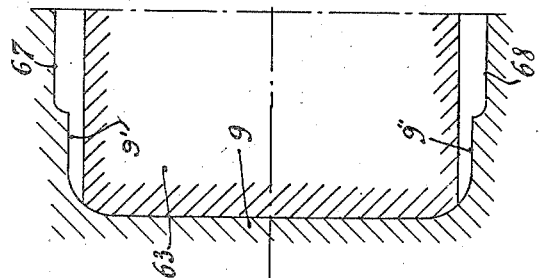
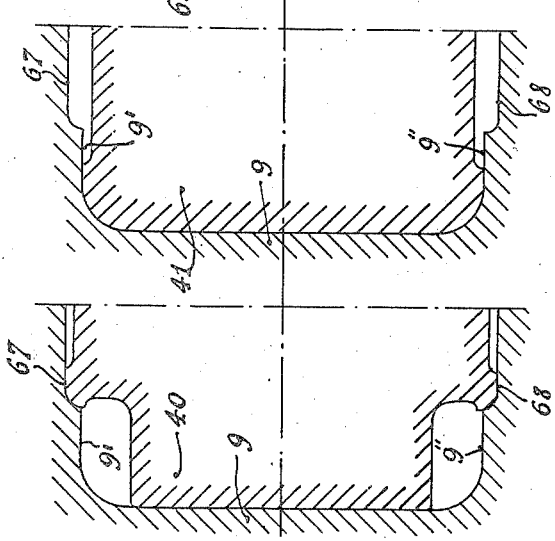

Jan. 17, 1950 E. BUGATTI 2,494,797
LATHE
Filed Dec. 27, 1945 5 Sheets-Sheet 5

Inventor: Ettore Bugatti
By Mauro & Lewis
Attorneys

Patented Jan. 17, 1950

2,494,797

UNITED STATES PATENT OFFICE 2,494,797

LATHE

Ettore Bugatti, Paris, France

Application December 27, 1945, Serial No. 637,316
In France March 1, 1944

Section 1, Public Law 690, August 8, 1946
Patent expires March 1, 1964

14 Claims. (Cl. 82—20)

For machining engine crank shafts and more generally such works as are heavy or not rigid enough or comprise unbalanced portions so that it is uneasy to rotate the same on a conventional lathe, it is usual to employ a particular type of turning machine, known as crank shaft turning lathe, in which the work is supported and held against rotation on the bed of the machine while the tools are mounted in a carrier rotating around the work being operated upon.

It is an object of the present invention to provide a machine of this type, capable of machining all the crank pins and the corresponding faces of the webs or all the journals and the corresponding faces of the webs on rough forged workpiece or rough blanks or even cylindrical billets which have not been subjected to any forging preparation. A further object is to provide a crank shaft turning machine in which the operation takes place without resetting and without dismounting any part which is particularly advantageous in the case of crank shafts of engines provided with a large number of cylinders and bearings. The volume of material to be removed from the blank is sometimes more considerable than that of the finished workpiece and the periods of machining are very long with conventional turning machines. It is a third object of this invention to provide an improved crank shaft turning machine which enables the period for machining a crank shaft to be considerably shortened.

A preferred form of construction will be hereinafter described but it is to be understood that my invention is not restricted to this particular example.

The tools are carried in revolving plates, there being provided a plate for each crankpin or each journal to be machined.

On each of these plates may be located either one or more tools, distributed uniformly about the centre. Each of these tools is fitted into a tool holder capable of sliding radially in guides provided in the rotating plates.

A rotary cam is combined with each of the rotating plates. Subjected to a movement of rotation at a speed different from that of the corresponding rotating plate, this cam produces a radial movement of the tool-holders and consequently of the tools, through rollers carried by the tool-holders. The cams thus provided ensure the working stroke of the tools and also the return stroke in such a manner as to effect automatically the complete cycle of operations in a predetermined number of revolutions.

For this purpose, each cam is provided with as many similar elements as there are tools on the same rotating plate. These elements are distributed uniformly around the centre and each of them causes the tool opposite which it is located to advance and retract. After replacing the finished workpiece by a blank, each cam element takes the place of the following or preceding cam element for action on tools, i. e. causes the tool which followed it or which preceded it during the preceding cycle to move. The workpiece being machined is held by stationary back rests, secured to the framework, located between stationary plates, also secured to the framework and in which are guided the rotating plates, a rotating plate being provided for each stationary plate.

The stationary plates are preferably of circular shape; their axis, concentric with that of the journals of the crank to be machined, is set-off relatively to that of the rotating plates by an amount equal to half the throw of the crank, when the tools are to be operated for machining crank pins. For machining journals all the plates, stationary and rotating, are concentric with the axis of the journals of the crank shaft.

These plates are provided in the central portion, with a hole of sufficient diameter to permit of the passage of the crank shaft to be machined.

The tools which operate solely by cutting, that is to say without longitudinal movement, are of the same shape and of the same dimensions as the hollow comprised between two arms, which hollow corresponds either with a crank pin or a journal.

The rotating plates and the cams are connected together in pairs, by gear trains which drive them at a suitable speed. These gear trains are composed of pinions keyed to one or more shafts driven by a driving member, and of gear wheels some of which are secured to the rotating plates and the others to the cams. There should exist between the gear trains depending from a plate and from its cam such a relation that the speed of the cam differs slightly from that of the plate.

This condition being obtained, the cams move the tool holders and the tools slowly in the guides of the rotating plates; this movement should be of the order of a few tenths of a millimetre per revolution of the plate.

The description which follows with reference to the accompanying drawing given by way of example in a non-limiting sense, will give understanding how the invention may be carried into effect, the features which appear from the drawing and from the text forming, as will be understood, part of the said invention.

Figures 7a to 7d are diagrams illustrating the shape of four tools which machine the same crankpin or the same journal.

Figures 8 and 9 show, by way of modification and in part, a form of construction different from that of Figures 2 and 3, Figure 9 being a partial section on the line IX—IX of Figure 8.

Figure 1:
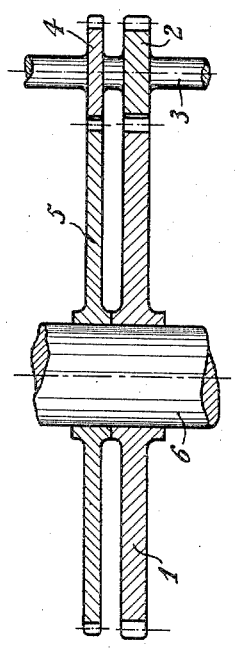
Figure 1 is a diagram showing in axial section, the arrangement of two couples of gear wheels controlling a cam and the corresponding rotating cam.

The gear wheel 1 (Figure 1) is secured to one of the rotating plates (not shown). It is driven by a pinion 2 formed integral with the driving shaft 3. On the shaft 3 is also keyed a pinion 4 which drives a gear wheel 5 secured to the cam corresponding with the rotating plate in question.

Between the gear wheels and pinions 1, 2, 4 and 5 the ratios are such that the gear wheels 1 and 5 rotate at different speeds, which are very close to one another, about a common axis which in the showing is that of a shaft 6.

Figure 2:
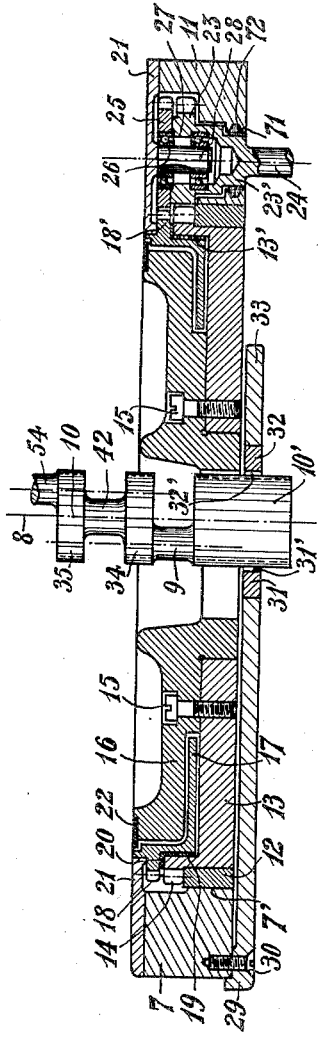
Figure 2 is an axial section through one of the elements of the machine.

Figure 2 shows in a less summary manner the device which connects together the elements appertaining to the same stationary plate 7. The plate 7, which is of circular shape, is provided with a bore 7', eccentric relatively to the axis 8 of the crank shaft when it is desired to machine the crank pins and concentric with this same axis 8 when it is desired to machine the journals. In the present case the stationary plate 7 is in the position of machining the crank pin 9 of the crank shaft 10. Its outer surface 11 is concentric with the axis 8 and its bore 7' is concentric with the axis of the crank pin 9.

In the bore 7' is forced with a close fit a ring 12 in which turns a plate 13 secured to a gear wheel 14 of large diametrical pitch. To the rotating plate 13 is secured, by a series of screws 15, a plate 16 of which the purpose is to guide the tools. The plates 13 and 16 could be integrally formed if it were not necessary to take into consideration the possibility of mounting the cam 17 and the gear wheel 18 formed integral with this cam. The cam 17 turns in a ring 19 which is guided in the bore 13' of the plate 13. The spacing between the gear wheels 14 and 18 is maintained by a friction washer 20.

A cover 21, secured to the open face of the stationary plate 7 by any suitable means, holds, with slight axial play, the gear wheels 18 and 14 and the washer 20, which on the other hand bear through the gear wheel 14 against the face of the ring 12. A fluid-tight washer 22, secured to the plate 16, provides a baffle in combination with a sunken shoulder 18' in gear wheel 18.

A pinion 23 connected to the driving shaft 24 is secured to a pinion 25 by screws not shown. Pinion 23 is arranged to drive gear wheel 14 while pinion 25 drives gear wheel 18. The pinions 23 and 25 correspond respectively with the pinions 2 and 4 shown in Figure 1. Two ball bearings 26, separated by a distance piece 27, guide the pinion 23 which is provided with a recess for this purpose. The bearings 26 are centred by their inner ring on a shaft 28 formed integral with the cover 21.

A lubricating device, based on the use of passages supplying oil to the inside of the space comprised between the recess of the stationary plate 7 and the cover 21 and, preferably, in proximity to the meshing points of the teeth of the gear wheels and the pinions 14, 18, 23 and 25 may be provided without it being necessary to describe it in greater detail.

The extension 23' of the pinion 23 ensures fluid-tightness in co-operation with a felt 71 located in a groove 72 of the plate 7.

A back rest 29 (Figures 2, 3 and 5) is centred on the stationary plate 7 and fixed by a series of screws 30. This back rest may, according to another method of construction, be secured directly to the framework of the machine. In all cases its purpose is to hold by jaws 31 and 32 secured to the back rest 29 and by its strap or movable limb the crankshaft 10 which is provided, for the purpose, with a thick part 10' having at least the same diameter as the crank shaft webs 34, 25, etc.

Figure 4:
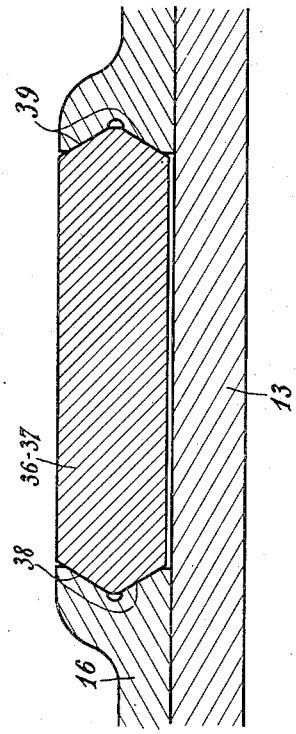
Figure 4 shows to a larger scale, a detail relating to the guides of the tool holders.
Figure 3:
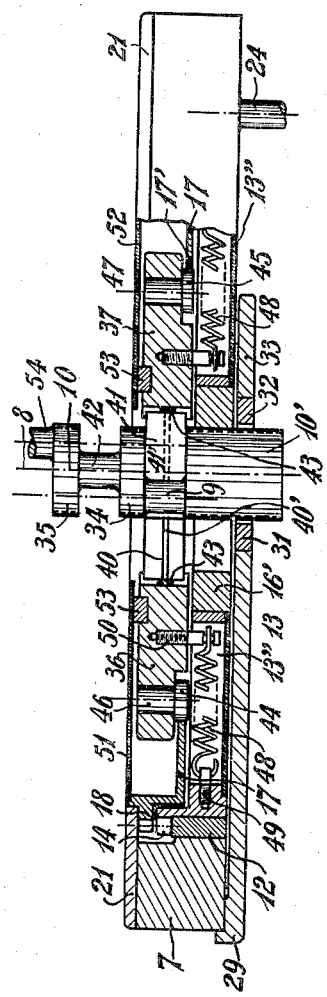
Figure 3 is a partial axial section of the same element of which the movable parts are shown in a position different to that in Figure 2.

The tool holders 36 and 37, which appear in Figure 3, are of prismatic shape. Their cross-section is shown in Figure 4, which also illustrates the construction of the guides 38 and 39 provided in the plate 16, secured to the rotating plate 13. It is to be observed that the plate 16 is cut through by mortises in which the tool holders 36 and 37 move radially, as also other tool holders not shown in Fig. 3. The only portion of plate 16 which is seen on Fig. 13 is thus an inner ring 16' serving to effect centring in the hole of the plate 13. The assembling screws 15, referred to in connection with Figure 2, are thus grouped in the parts of the plate 16 comprised between the mortises of the guides 38 and 39.

Figure 6:
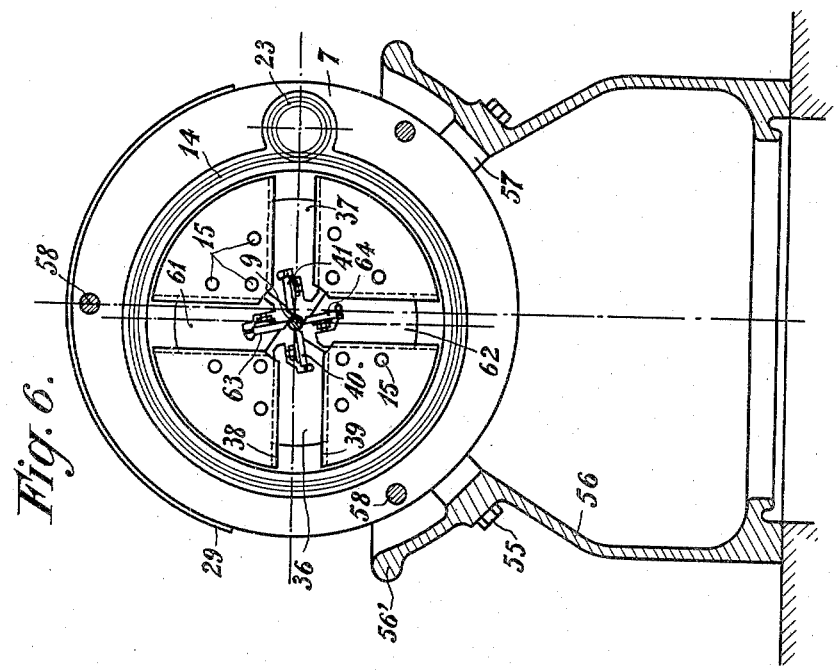
Figure 6 is a similar view showing one of the rotating plates provided with its tools.

The tools 40 and 41 (Figures 3 and 6) which have the width of the hollow located between the cylindrical part 10' of the crankshaft 10 and the web 34 which separates the crankpin 9 from the shaft portion 42, are fitted into the tool holders 36 and 37 by a method preferably based on the tightening of a big screw (Figure 6). These tools 40 and 41 should be centred in the direction of movement of the tool holders 36 and 37 which takes place in a plane perpendicular to the axis 8 of the crank shaft. For this purpose they should be provided either with a key 40' or 41' engaging with a groove in the tool holders 37 and 38 or another guiding device responding to the same purpose. Finally the adjustment of the length of the tools 40 and 41, adjustment on which depends the precision of turning of the crank pin 9, is effected by spacing wedges 43 placed in position before mounting the tools 40 and 41.

Rollers 44 and 45, secured to shafts 46 and 47, turning in suitable bores of the tool holders 36 and 37, are continuously in contact with the contours 17' of the cam 17. The rollers 44 and 45, by rolling on the part 17', produce the movements of tool holders 36 and 37 and of the tools 40 and 41 towards the crankpin 9. The reverse movement is obtained by the action of traction springs 48 mounted in a recess 13'' of the rotating plate 13. The springs 48 are hooked at one end to the wall of the recess 13'' by staples 49 and at the other end to the tool holders 36 and 37 by other staples 50.

Opposite the tool holders 36 and 37, the washer 22, which protects the mechanism located inside the rotating plates 13 and 16, may be replaced by sheets 51 and 52, secured to the plate 16. Felt 53 or other analogous devices bearing against the tool holders 36 and 37 maintain lubricating oil in the parts where its presence is necessary and oppose the entrance of chips.

The arrangement of the tool holders 36 and 37 and of the tools 40 and 41, which has been described, is naturally reproduced on the other tool holders and tools guided in the plate 16 and not shown in Figure 3.

The assembly formed by the stationary plate 7 and the members which move in the interior of this plate (flanges 14—18, plates 13—16, cam 17, pinions 23—25, driving shaft 24, etc.) is reserved exclusively for the machining of the crank pin of the crank shaft 10. The other crank pins of the crank shaft 10, for example the crank pin 54, separated from the shaft portion 42 by the web 35, are machined simultaneously by means of devices analogous to that which has been described in connection with the crank pin 9, each of these devices being provided with a separate driving shaft.

The stationary plates secured to the framework and corresponding with these various crank pins are spaced longitudinally by the same amount as the crank pins 9 and 54 and as all the other crank pins of the crank shaft 10.

In the intervals comprised between these various stationary plates, may be provided back-rests analogous to the back-rest 29 of Figures 2 and 3, and adapted to hold the crank shaft by its webs 34 or 35 or by any other web.

The spacing between the adjacent stationary plates is determined by the spacing wedges which permit of obtaining an exact spacing constant in length, such that checking of the dimensions lengthwise of the machined crankshaft becomes useless. The stationary plates and their spacing wedges are piled up and tightened by screwed rods passing therethrough and connecting them to stationary elements of the framework of the machine.

The eccentric bores such as 7' of the plate 7 are so located that their axes coincide with those of the crankpins such as 9. When the crank shaft to be machined is provided with webs such as 10", it is advantageous to provide key ways in the surface of these webs 10', 34, 35, etc., in the longitudinal planes passing through the axes of the crank pins. Keys 31' and 32', secured to the jaws such as 31, 32 of the back-rests such as 29, determine the position of the crank shaft 10 at the moment of proceeding to placing it in position in the machine.

When the webs are not concentric amongst themselves or concentric with the axes of the journals, it is useless to provide keys in the back-rests as no movement of rotation can take place during the machining and the position of the workpiece is obtained automatically by the fact that the projections, in the transverse plane, of the axes of the webs are separate from one another.

Figure 5:
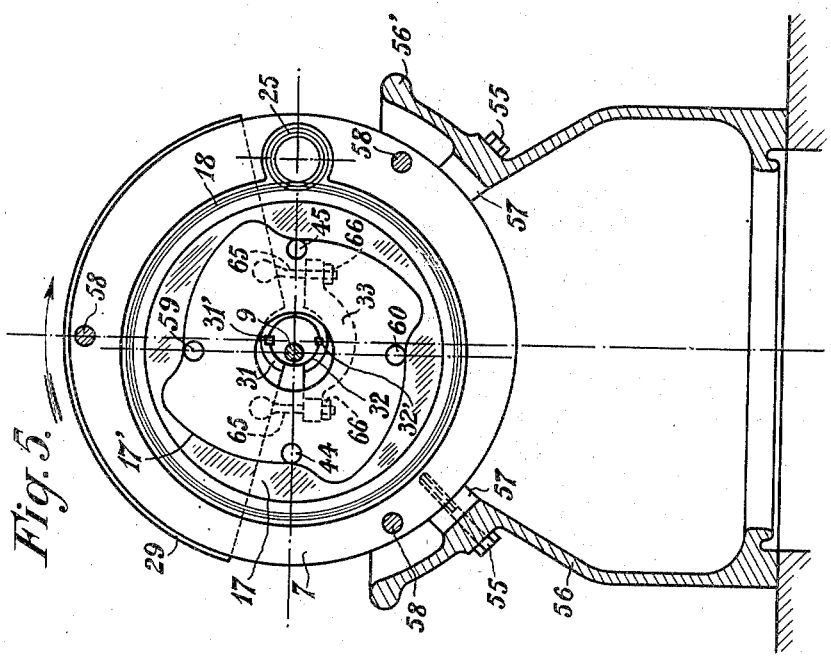
Figure 5 is a partial cross section of the machine showing, in particular, one of the cams.

Figure 5 shows the arrangement of the machine as a whole. The stationary plate 7 is bolted at 55 to the framework 56, with the interposition of wedges 57. The framework 56 is hollowed in its lower portion so as to permit of the rapid removal of machining chips.

Figure 10:
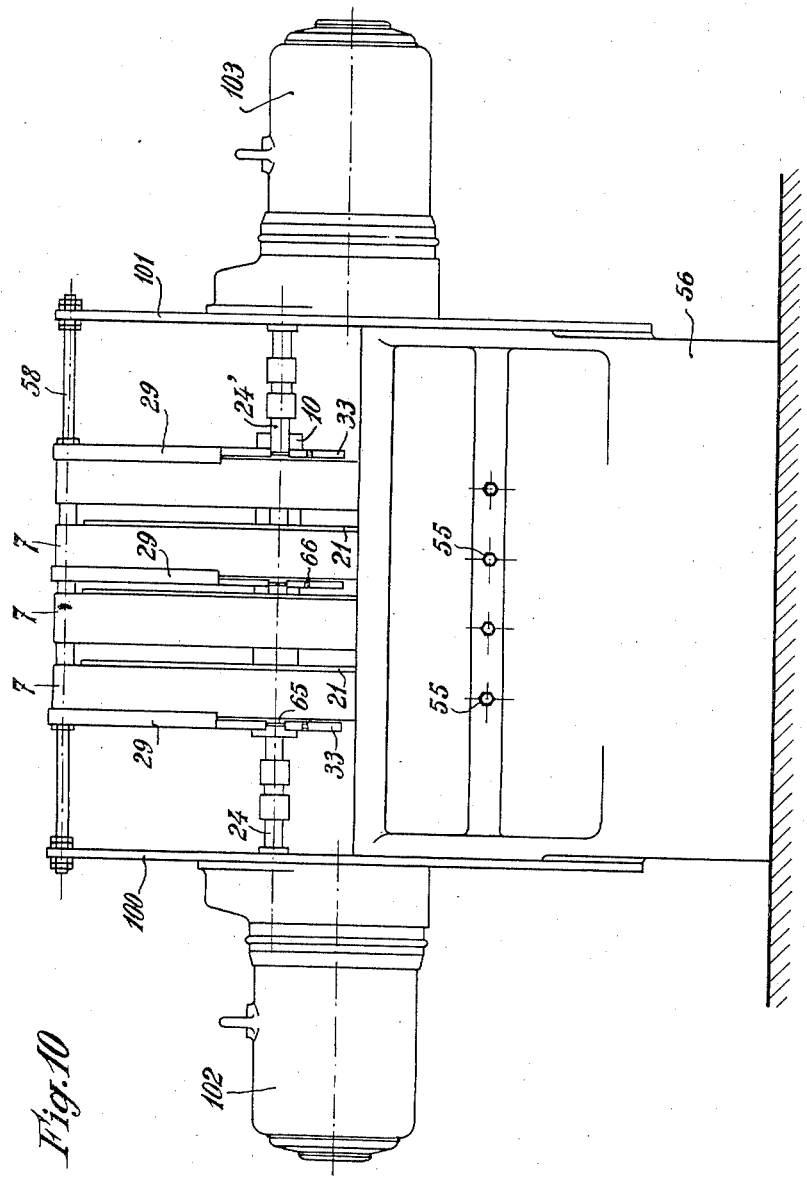
Figure 10 is an elevation of a crankpin turning lathe for a four-pin crankshaft.

In this Figure 5 and also in Figure 10 where the same reference numerals denote the same parts are shown the screwed rods 58 which hold the pile of stationary plates such as 7 and their wedges or distance pieces. The screwed rods bear, at the two ends of the machine, against two solid plates 100, 101 (Fig. 10) of the framework 56. These plates limit the space in which are located all the members and enable this space to be closed by a removable cover of which the presence, during machining, protects the personnel against the projections of oil and chips. This cover preferably terminates in the space comprised between the cheeks 56' of the framework 56 and the outer surface of the stationary plates such as 7. These end plates 100, 101 may also serve to support motors 102, 103 (Fig. 10) which drive the driving shafts such as 24, either directly or by means of a reduction gear or a speed gear box.

Referring to Fig. 10, motor 102 drives shaft 24 which controls bodily revolution and feed of tools machining the first and third pin from the right of the figure, while motor 103 drives shaft 24' for controlling bodily revolution and feed of tools machining the second and fourth pin, it being remembered that in a four-pin crankshaft for the machining of which the apparatus shown on Fig. 10 is designed, the crankpins are aligned two by two.

Other elements already referred to in connection with Figures 2 and 3, are shown in Figures 5 and 6, for example the cam 17 and the rollers 44, 45, 59 and 60 which control the movements of the tool holders 36, 37, 61 and 62 and of the tools 40, 41, 63 and 64.

The number of tools has been chosen equal to four, this number being that which permits of the best use of the surface of the plate 16 and, at the same time, the most simple construction. Any other number may be adopted provided that the conditions of construction of the cam 17 permit of this.

In Figure 5 also appears a specific construction of the stay 29 and its movable part 33. The latter is connected to the back-rest 29 by oscillating screwed rods 65 and nuts 66. Any other arrangement, for example, a movable part hinged to the back-rest by a hinge and tightened at the other end by a swingable rod, etc. may be adopted.

Figs. 7a to 7d diagrammatically show the arrangement and shape of four tools of the same set. The first tool, for example tool 40, provides for cutting out side recesses 67, 68 which enable subsequent truing up of crank pin 9 to be easily effected. The second tool 41 machines the levelling recesses of the crank pin 9, with its lateral faces 9' and 9". Finally the third tool 63 and the fourth tool 64 only produce a portion of these levelling recesses whilst the four tools operate at once on the cylindrical part of the crank pin 9. The latter operation being the most important the four tools participate therein simultaneously so that the feed per revolution of the tool holder plate is divided by four. On the contrary the operation on the flanks (lateral faces 9' and 9"), on the levelling recesses and on the lateral recesses 67 and 68, may be ensured, for each of these parts, by a single tool. For the recesses it may be mentioned that the more the cylindrical part of the crank pin 9 is approached the greater the number of tools participating in their machining.

According to another construction (Figures 8 and 9) provision is made for making the gear wheel 18, and the cam 17 movable about the centre of the crank pin 9 by the necessary amount to compensate a possible loss in precision in the position of the tools. In fact when allowing for an advance of a tenth of a millimetre per revolution of the tool holder plate, this advance to be divided by the number of tools (four in the present case) that is to say an advance of two centimetres and a half per tool, it is necessary to adjust the position of the tools with such a precision that the spacings are less than two centimeters and a half from one tool to another.

The gear wheel 18 is, in this case, held in position by blade springs 69 supported in a bore 13 of the gear wheel 14 which itself is guided concentrically by the ring 12. A ring 70, in which the gear wheel 18 rotates at a low relative speed, is provided with notches 70' which prevent it from following the gear wheel in its movement.

The cam 17, which presses the tools against the workpiece 10, is centred automatically by the operation of the tools, which, distributed uniformly about the centre, exert no thrust which would tend to move the cam 17 away from the axis relatively to the workpiece 10. The springs 69 or other similar springs (for example coiled springs arranged radially) ensuring the holding of the ring 70, the cam 17 and of the gear wheel 18 at the moment at which the tools attack the workpiece 10. This work is comparable with that of a free boring blade in its blade holder (borer with a floating blade).

The machine which has been described in its principal lines permits of the use of a considerable number of tools without causing the workpieces being machined to be subjected to bending actions, torsions or vibrations liable to destroy the precision of machining. This is explained by the presence of rigid back-rests which may be provided in large number, at least one per crank pin or per journal as the case may be.

Each of these back-rests applies its clamping action in immediate proximity to the point at which the tools of the plate adjacent to that on which it is itself secured, work. This feature is exploited for ensuring the cooling of the workpiece by spraying. For this purpose, it is convenient to provide in the thickness of each back-rest a passage of suitable section, closed by a thin plate forming a cover and leading by an orifice in the form of a slot in the operative zone of the tools. These passages may be supplied by a pipe line passing to the outside of the back-rests and stationary plates and connected to a pump. A second pipe line ensures in an analogous manner the lubrication under pressure of the rotary or sliding members contained in each of the stationary plates.

What I claim is:

1. A work machining unit which comprises the combination of a frame having a bore therein; a rotary plate revolubly borne in the bore of said frame having substantially radial recesses opening into a central recess of said plate; a plurality of tool-holders each of which is slidably held for radial movement in one of said substantially radial recesses; rotary camming means revolubly supported from said frame in said bore thereof operatively engaging said tool-holders for simultaneously moving the same towards said central recess; and driving means operatively associated with the rotary plate and rotary camming means, supported from the frame, for simultaneously revolving said plate and camming means at slightly different angular speeds.

2. A work machining unit which comprises the combination of a frame having a bore therein; a rotary plate revolubly borne in the bore of said frame having substantially radial recesses opening into a central recess of said plate; a plurality of tool-holders each of which is slidably held for radial movement in one of said substantially radial recesses; a second rotary plate revolubly borne from said frame in the bore thereof; means supported from the frame for simultaneously revolving both plates at slightly different angular speeds; and means operatively interposed between said second rotary plate and said tool-holders for simultaneously moving the latter towards said central recess in response to the difference between said angular speeds.

3. The combination of claim 1, which further comprises resilient means interposed between the tool-holders and the rotary plate, for biasing said tool-holders away from the central recess.

4. In a work machining unit of the type described, the combination of a circular plate including two superimposed component parts assembled together with an annular gap between them, one of said parts having a substantially radial recess in a face thereof, which meets said gap; a tool-holder slidably held in said recess for radial movement therein; and a ring revolubly borne in said gap, adapted and arranged to move said tool-holder in its recess in response to relative rotation of the ring with respect to the two part plate.

5. The combination of claim 4, which further comprises a protective lid secured to said plate over the recess; and means between said lid and said tool-holder attached to one of them and frictionally engaging the other, to provide a dust-proof seal.

6. The combination of claim 4 wherein said ring has a peripheral flange and one of the plate component parts has a projecting rim with a peripheral flange on said rim which provides a bearing for the ring flange.

7. The combination of claim 4, said ring having a peripheral flange while one of the plate component parts has a projecting rim with a peripheral flange thereon surrounding the ring flange with an annular space therebetween; a resilient spacing member in ring formation being accommodated in said space and operatively engaging said flanges.

8. A lathe for simultaneously machining spaced-apart revolution surfaces on an elongated work-piece, which comprises a stationary cradle having side cheeks; a plurality of spaced-apart ring-like machining units, each of which includes at least one substantially radially positioned tool, means for bodily revolving said tool in said ring-like unit and means for moving the tool substantially radially in proportion to revolution thereof; means for detachably securing said units in said cradle in proper spaced-apart relationship; at least one elongated rigid member passed through the assembly of units and side cheeks of the cradle, detachably secured to the latter; a plurality of spacers operatively interposed between said units and between each cheek and the adjacent outermost unit; and means for transmitting drive to the tool revolving means of the various units.

9. A lathe for simultaneously machining the crankpins on a crankshaft blank, which comprises the combination of a stationary bed; a plurality of tools, each of which is adapted for machining a crank pin on the crankshaft blank, the tools being located in spaced-apart parallel planes substantially at right angles to the bed; means in each of said planes for bodily revolving the corresponding tool in operative contact with said blank around the same, and moving said tool substantially radially with respect to the blank in proportion to revolution, the various means being spaced apart to correspond with the spacing of the crankpins of the crank shaft to be produced; rigid means in each plane in ring formation about the tool revolving means, detachably secured to the bed, providing a bearing for said tool revolving means; and means supported from the rigid means in each plane for transmitting drive to the tool revolving means.

10. The combination of claim 9, the various rigid means being so shaped that their outer surfaces are spaced-apart sections of one cylinder having its axis in parallel relationship with said bed.

11. A lathe for simultaneously machining spaced-apart surfaces of revolution on an elongated work-piece, which comprises the combination of a stationary frame; a plurality of tools, each of which is adapted for machining a revolution surface on the work-piece, the tools being located in spaced-apart parallel planes substantially at right angles to the frame; means in each of said planes for bodily revolving the corresponding tool in operative contact with said work-piece around the same, and moving said tool substantially radially with respect to the work-piece in proportion to revolution; rigid means in each plane in ring formation about the tool revolving means, secured to the frame and providing a bearing for said tool-revolving means; drive transmitting means co-extensive with the rigid means assembly, passing through the same for simultaneously revolving the various tool revolving means; and means supported from the frame for actuating said drive transmitting means.

12. The combination of claim 11, the frame being an open-bottom, horizontal cradle, the combination further comprising movable means operatively associated with said cradle for confining the remainder of the combination elements within a closed space.

13. The combination of claim 11, which further comprises means on at least two of said rigid means for supporting the work-piece from said frame in immovable position.

14. The combination of claim 11, which further comprises means on said frame and on at least two of said rigid means for supporting the work-piece from said frame in immovable position.

ETTORE BUGATTI.

REFERENCES CITED

The following references are of record in the file of this patent:

UNITED STATES PATENTS

| Number | Name | Date |
|---|---|---|
| 490,427 | Childs | Jan. 24, 1893 |
| 2,264,651 | Webb | Dec. 2, 1941 |

FOREIGN PATENTS

| Number | Country | Date |
|---|---|---|
| 106,188 | Great Britain | May 17, 1917 |
| 358,727 | Great Britain | Oct. 15, 1931 |
| 670,703 | Germany | Jan. 24, 1939 |